United States Patent [19]

Nossen

[11] 4,203,002
[45] May 13, 1980

[54] CODE CORRELATOR LOOP USING ARITHMETIC SYNTHESIZER

[75] Inventor: Edward J. Nossen, Cherry Hill, N.J.

[73] Assignee: RCA Corporation, New York, N.Y.

[21] Appl. No.: 841,058

[22] Filed: Oct. 11, 1977

[51] Int. Cl.² ............................................. H04L 7/08
[52] U.S. Cl. .................................................. 375/116
[58] Field of Search .................. 178/69.1, 88; 328/14, 328/13

[56] References Cited

U.S. PATENT DOCUMENTS

| | | | |
|---|---|---|---|
| 3,973,209 | 8/1976 | Nossen | 328/14 |
| 4,010,421 | 3/1977 | Lind . | |
| 4,020,283 | 4/1977 | Epstein | 178/69.1 |

Primary Examiner—Benedict V. Safourek
Assistant Examiner—Michael A. Masinick
Attorney, Agent, or Firm—H. Christoffersen; S. Cohen; D. W. Phillion

[57] ABSTRACT

Circuit and method for synchronizing a clocked coded output signal with an iterative encoded input signal in a time relation that results in the greatest correlation. An AS (arithmetic synthesizer) initially produces a clock signal at a rate different from that of the input signal. The clock signal so produced drives a waveform generator that produces an iterative encoded signal similar in kind to the input signal. As the time (phase) relation between the generated signal and the input signal is varied, a correlation coefficient is derived at successive phase positions. The AS is then set into the condition of greatest correlation and synchronized with the input signal.

11 Claims, 4 Drawing Figures

CODE CORRELATOR LOOP USING ARITHMETIC SYNTHESIZER

Modern ranging systems use coded waveforms to resolve range ambiguity to some minimum distance, to reject interference from uncoded signals, and to reduce the power spectral density. Range ambiguity is resolved to some minimum distance by providing a coded sequence that spatially exceeds the minimum distance, e.g., a 3.5 millisecond sequence equals about 653 miles. Interference from uncoded signals is rejected by synchronous detection and cross-correlation, the uncoded signals appearing as noise having approximately a zero means. The coding causes the transmitter to spread the signal over a wider bandwidth which reduces the power spectral density which is restored in the receiver. (This has the advantage of making covert signals difficult to detect.)

To demodulate the input (received) signal, a signal which is a replica of the input signal must be internally generated. One of the problems in demodulating such coded signals is to synchronize accurately the internally generated signal with the input signal.

Cross-correlation is accomplished by multiplying the corresponding instantaneous values of the input and internally generated signals and filtering the resulting signal. When the input signal and the internally generated signal are exactly in phase, the correlation value (filter output signal) will have a maximum value. As the phase difference between the two signals changes in either direction, the correlation value decreases.

In prior art circuits, the phase angle (time relationship) between the internally generated signal and the input signal is varied by generating the internally generated signal at a frequency slightly offset from that of the input signal. This causes the internally generated signal waveform to move (or to sweep) across the input signal waveform. At various phase positions, a correlation value is derived and when it exceeds a predetermined threshold value, the signals are presumed to be synchronized and tracking (demodulation) is attempted. A disadvantage of this prior art scheme is that the tracking is often attempted at a phase position which does not correspond to the maximum correlation value, that is, the threshold may be reached before the two signals compared have reached their best match.

The circuit of the invention described and claimed herein determines the maximum correlation value and then maintains it for signal demodulation. When using in a ranging system, this improves the range accuracy of a system and when used in the other systems briefly mentioned above, results in corresponding improvements in the system performance.

An embodiment of a circuit according to the invention has a timing means for producing a first set of timing signals and an arithmetic synthesizer with a frequency register storing a frequency number and a phase accumulator controlled by the first timing signals. The arithmetic synthesizer produces the clock signal which drives a waveform generator supplying iterative encoded output signals of the same form as the iterative encoded input signal. The correlator receives the input signals and the generated signals and produces a correlation signal and modifying signals. The modifying signal is coupled to the frequency register means to change the frequency number and the correlation signals cause the phase accumulator in the arithmetic synthesizer to be set to a value corresponding to the best correlation signal.

Figure 1:
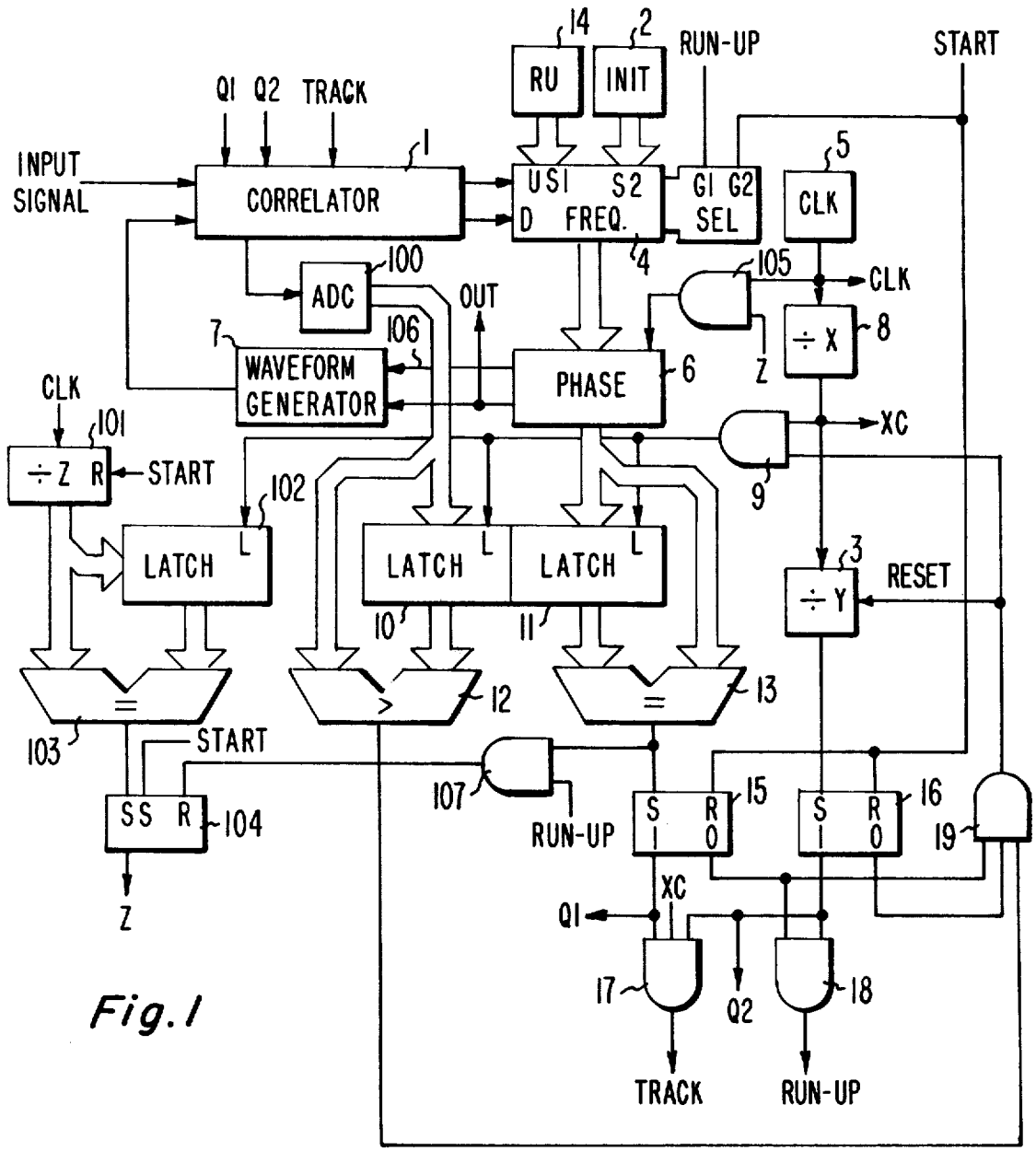
FIG. 1 is a logic diagram of an embodiment of the invention.

The circuit shown in block form in FIG. 1 synchronizes a coded waveform or synchronization pattern of the input signal with an internally generated signal of the same kind to produce a correlation coefficient signal value (referred to hereinafter as simply the correlation coefficient). The correlation coefficient is stored and, as the sweep by the generated signal progresses, the stored value is replaced by a greater valued coefficient when the latter occurs. An arithmetic synthesizer produces the output clock signal (OUT) that drives the waveform generator, and both a phase number and a Z count associated with each stored correlation coefficient are also stored. When the synchronization pattern has been swept, the phase number corresponding to the greatest correlation coefficient is forced into the phase accumulator and the phase accumulator's clock is stopped. When a new Z count is equal to the stored Z count, the phase accumulator clock is started and thereafter the arithmetic synthesizer follows the input signal at the relative position of greatest correlation. The detailed description of this operation is given below.

A frequency register 4 and a phase accumulator 6 form a combination known as an arithmetic synthesizer. The phase accumulator 6 produces three output signals. The first is the output clock signal (OUT) signal. This signal is the carry signal from the m-th stage of the adder in the phase accumulator 6. (The value of m is explained in more detail below.)

The second signal is a reset signal on line 106 which resets a waveform generator 7 to a fixed or initial value. This function is explained in more detail below. This reset signal is the carry-out signal from a more significant adder (n-th) stage than the m-th stage in the phase accumulator 6, i.e., $n > m$.

In general, the n-m most significant bits can be used to determine the bit being processed in the pattern sequence. This is useful for representing unambiguous range information in ranging systems. If, for example, a 24-bit phase accumulator is used with the overflow signal taken from the 12-bit stage, the most significant twelve bits represent a coarse range (timing frame) and the least significant twelve bits represent fine range resolution.

The third output signal from the phase accumulator is an h-bit digital word (where h can be any reasonably valued integer) representing the phase that has accumulated from adding to the phase value the value in the frequency register 4. (The integer h can equal n.) The frequency register 4 is shown implemented with a presettable dual-clock up/down counter. Details of the construction of such a counter are well known in the art and one example is shown in the data sheets for a type SN74193 binary counter integrated circuit (Texas Instruments, Inc.). The frequency register 4 is provided with two alternate data input signals, S1 and S2, which are gated into the register 4 via the selector signals, G1 or G2, respectively. The dual clock input signals, U and D, cause the counter to count up or down, respectively, depending upon which input signal is pulsed.

The clock signals for the arithmetic synthesizer are applied to the phase accumulator 6 from a clock source 5 through an AND gate 105. Each clock signal from the clock source 5 while the AND gate 105 is enabled causes the phase accumulator 6 to add to the phase number in the phase accumulator 6 the binary number in the frequency register 4. Periodically, an overflow (carry-out) from the m-th stage occurs, producing an output signal (OUT). The OUT signal from the phase accumulator 6 triggers a waveform generator 7 which produces a signal similar in shape to the synchronization pattern of the input signal. The input signal and the signal from the waveform generator 7 are processed in a suitable type correlator 1, which type depends on the waveform being correlated. A specific waveform generator and correlator are described in more detail below.

There are essentially three modes of operation of the circuit of FIG. 1. One mode is the acquisition mode during which the iterative encoded incoming signal is swept by the internally generated iterative encoded signal from the waveform generator 7. The second mode is the run-up mode in which the phase number in the phase accumulator 6 is forced into equality with the stored maximum value. (Alternatively, the phase accumulator can be implemented so that the phase value can be set externally.) The third mode is the track mode in which the circuit produces an output clock signal (OUT) or coded waveform signal that remains in synchronization with the input signal.

The modes are controlled by the output signals from two flip-flops 15 and 16. The acquisition mode is initiated by the application of a start signal from some external device such as a utilization device using the output clock signal. The start signal resets the flip-flops 15 and 16 and gates into the frequency register 4 a fixed initial value from a register or hard-wired gate network 2. The initial value set into the frequency register 4 causes the output clock signal (OUT) rate from the phase accumulator 6 to exceed slightly the input signal frequency. For example, if the input signal frequency or bit rate is 1 MHz, the phase accumulator output signal might be 1.01 MHz. The clock 5 usually operates about an order of magnitude faster than the input signal frequency. In the example above, it might be about 10 MHz. If $N_m$ denotes the maximum capacity of the first m stages of phase accumulator 6, i.e., $N_m = 2^{m-1} - 1$, then the value in the frequency register 4, $N_f$, would be approximately $N_m/9.09$ to produce an output signal of approximately 1.01 MHz.

Figure 2:
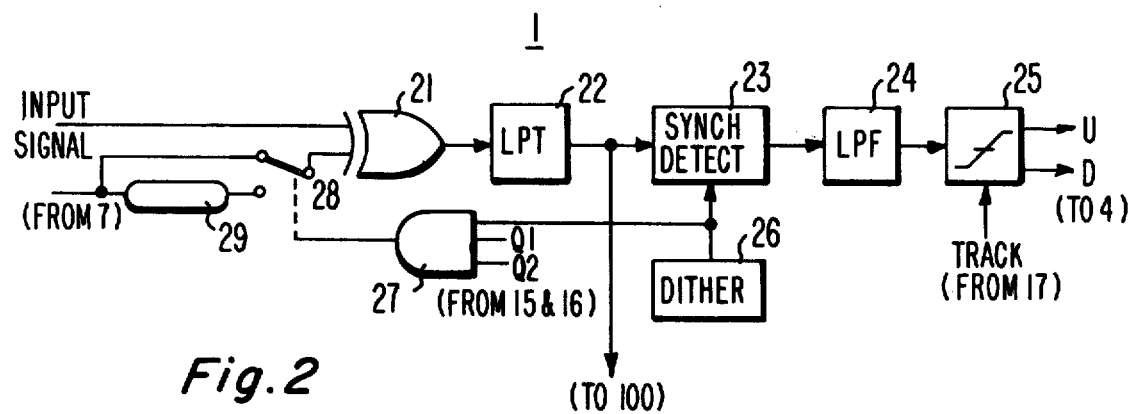
FIG. 2 is a logic diagram of a correlator suitable for use in the circuit of FIG. 1.

A block diagram of a suitable correlator 1 for use with pseudo-random code patterns is shown in FIG. 2. The input signal and the output signal from the waveform generator 7 are coupled to the input terminals of an XOR (exclusive-OR) gate 21. The signal from the waveform generator 7 is also coupled through a delay element 29 and a switch 28 is arranged to insert the delay element 29 in the signal path when activated. The output signal from the XOR gate 21 passes through a low-pass filter 22, which removes spurious transients and other undesirable high-frequency components, to a synchronous detector 23 and to an ADC (analog-to-digital converter) 100 (FIG. 1). A dither generator 26 operates the synchronous detector 23 and, via an AND gate 27, when activated, controls the switch 28. The AND gate 27 is enabled when the flip-flops 15 and 16 (FIG. 1) are both set, i.e., in the track mode. When the AND gate 27 is not activated, the switch 28 remains in the position bypassing the delay element 29. The output signal from the synchronous detector 23 is passed through a second low-pass filter 24 to a threshold detection device 25 which produces pulses to the clock inputs (U or D) of the frequency register 4 (FIG. 1) when in the track mode as supplied by the output signal from the AND gate 17 (FIG. 1).

Figure 4:
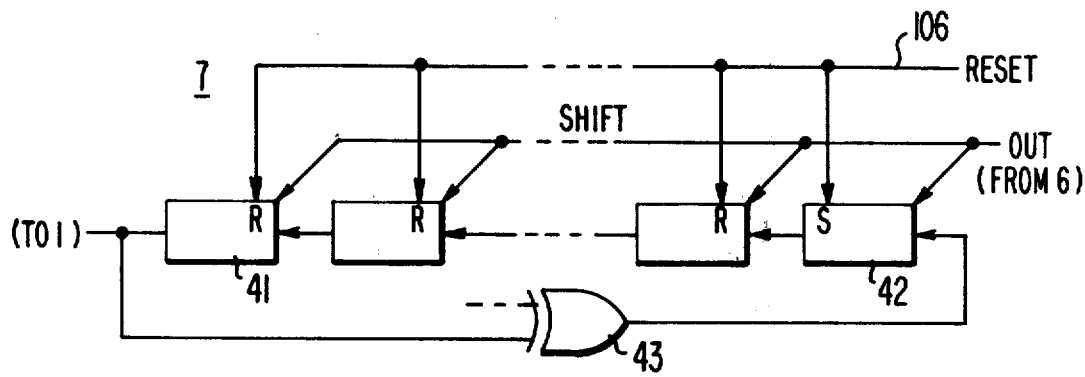
FIG. 4 is a logic diagram of a typical pseudo-random code generator.

A pseudo-random code generator (PRG) is illustrated in FIG. 4. A shift register of several stages is feedback-coupled from certain stages to produce a serial input value of logical one to the first stage 42 when the values stored in the feedback-coupled stages have a modulo-2 sum of one. At least one stage must be set initially; in the circuit of FIG. 4, it is the input stage 42. The feedback is shown generally by the XOR gate 43. In general, an n-stage PRG can produce a cyclic sequence of $2^n - 1$ bits. The n stages cycle through all $2^n$ combinations except that of all zeroes. The sequence depends on the feedback connections. The last stage 41 must always provide one of the feedback connections, else the PRG would be equivalent to an (n−1)-stage generator. All possible feedback connections do not produce the maximum cycle length of $2^n - 1$ bits. Tables are provided in the literature showing feedback connections for PRG's having up to 100 stages.

When used as the waveform generator 7 (FIG. 1), the reset line 106 is coupled to reset all the stages except the one which is set, in this example, stage 42. The output clock signal from the phase accumulator (6 FIG. 1) provides the advance or shift signal that shifts the contents of the shift register from stage to stage. The generated signal is taken from the final stage, although in practice it can be taken from any stage or the output terminals of the feedback XOR gates.

In the acquisition mode, the input signal and the signal from the waveform generator 7 are coupled directly to the XOR gate 21 whose output signal is filtered by the low-pass filter 22 and thence coupled to the ADC 100.

Figure 3:
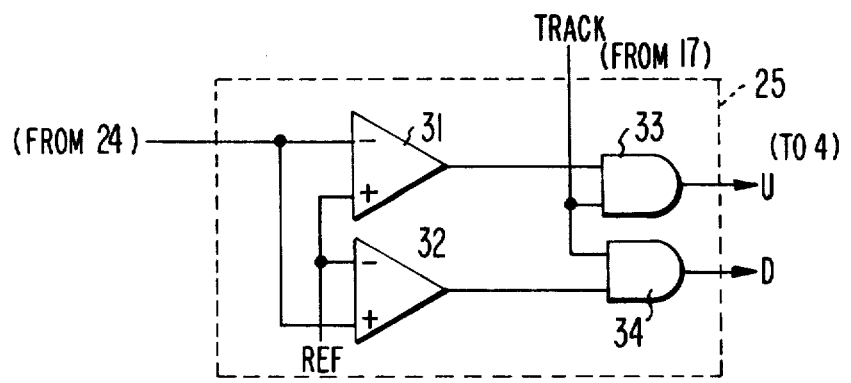
FIG. 3 is a logic diagram of a threshold device that can be used in the correlator of FIG. 2.

A suitable threshold device 25 is illustrated in detail in FIG. 3. The output signal from the low-pass filter 24 (FIG. 2) is coupled to the inverting terminal and the non-inverting input terminal of one of two operational amplifiers 31 and 32, respectively. The other input terminals of the operational amplifiers 31 and 32 are coupled to a reference voltage which can be approximately the average of the output signal from the low-pass filter 24, i.e., midvalue of the filter's voltage swing. With no feedback connection, the operational amplifiers 31 and 32 act as low hysteresis comparators producing signals at the output which prime AND gates 33 and 34, respectively. The output signal from the AND gates 33 and 34 produce the incrementing or decrementing pulses to the frequency register 4 (FIG. 1) to alter the frequency period of the clock output signal from the phase accumulator 6. The AND gate 17 which provides the track signal is periodically enabled by a divided-down clock signal XC which provides settling time for the filters 22 and 24 in the correlator 1 before changing the frequency number. There are no U and D output signals from the correlator during the acquisition or run-up modes of operation.

The output signal from the low-pass filter 22 (FIG. 2) in the correlator 1 is the correlation coefficient and is coupled to an analog-to-digital converter 100, the output binary signals from which are coupled to the data input terminals of a latch 10 and to a comparator 12. The contents of the phase accumulator 6 are applied to a latch 11 and to a comparator 13. The signal from the clock source 5 is divided in a divider 8 by a value of X, where X depends on the bandwidth of the low-pass filters 22 and 24 (FIG. 2) in the correlator 1. The output signal from the divider 8 activates an AND gate 9 which is enabled by the output signal from an AND gate 19. The AND gate 19 produces an enabling output signal while the flip-flops 15 and 16 are both in the reset state, i.e., during the acquisition mode, and the output signal from the comparator 12 indicates that the present value of the correlation coefficient from the ADC 100 exceeds a previous value stored in the latch 10. The output signal from the AND gate 9 latches the input data into the latches 10, 11 and 102. Thus, the value of the divider ratio X determines the dwell time required to produce the next correlation coefficient. The narrower the bandwidth of the low pass filters, the longer the dwell time required so that the ratio X is inversely proportional to the bandwith of the low pass filters yet greater than the ratio $N_m/N_f$. Typical values of X are in the range from 50 to 1000 as shown in an example below.

The output signal from the divider 8 is again divided by a value of Y in a divider 3. The value of Y depends on the length of the pattern or code signal being synchronized and the difference in the frequencies of the input signal and the OUT signal. The value of Y is sufficiently large to permit the sequence from the waveform generator 7 to sweep completely the synchronization pattern of the input signal. As an example, it will be presumed that the phase accumulator 6 has 24 stages and that the clock output signal is taken from the 12th stage carry-out; that is, $h=n=24$ and $m=12$. The reset line 106 is taken from the 24th, or final, stage. As before, it will be presumed that the signal rate is one million bits per sec. (1 MHz) and that the clock source 5 runs at 10 MHz. The waveform generator 7 would have twelve shift register stages. The input signal pattern, which is similar to the output signal from the waveform generator 7, will comprise a particular sequence of $(2^{12}-1=)$ 4,095 bits, and this 4,095 bit sequence or pattern repeats continuously. The divide-by-Y counter 3 is reset by the output signal from the AND gate 19 to insure subsequent full period counts.

The filter bandwidth determines the SNR (signal-to-noise ratio) improvement over the SNR of the input signal. For a 1 MHz. input signal clock rate, a filter bandwidth of about 10 KHz provides a 20 dB SNR improvement. (The filter bandwidth of a low-pass filter is the frequency at which the response drops to $-3$ dB.) The dwell time for the correlator 1 to build up (integrate) the signal is about equal to the reciprocal of the filter band pass using integrate-sample-dump filters. Since the dump time is unknown prior to synchronization, it is common practice to advance (sweep) in increments of about one-third clock period. Performance losses due to lack of dump time synchronization are then acceptably small.

At a 100-microsecond dump interval, 300 microseconds are required to sweep one clock pulse period. As a result, the sweep should be performed at 1.003 MHz and about 1.2 seconds will be required to sweep the 4,095 bit input pattern. The value stored in the initial register (or hardwired gate network) 2 must be approximately 411 (110011011 in binary) to produce the output clock signal (OUT) at 1.003 MHz (in this example). The Y divider must be three times the code or input signal pattern; in this example, 12,285, which can be implemented with a 14-stage counter.

During the acquisition mode, the correlation coefficient from the ADC 100 is compared to the stored previous value and, if greater, is stored in the latch 10. At the same time, the corresponding value of the phase number from the phase accumulator 6 is stored in the latch 11 and the corresponding value of the Z-counter 101 is stored in the latch 102. Therefore, at the end of the acquisition phase, the latch 10 contains the digital value of the greatest correlation coefficient, the latch 11 contains the digital value of the corresponding phase value from the phase accumulator 6, and the latch 102 contains the corresponding value from the Z-counter. With the AND gate 19 disabled, the values in the latches 10, 11 and 101 do not change.

When the Y divider 3 produces an output pulse to indicate the input pattern has been swept, the flip-flop 16 is set and the AND gate 19 is disabled and the AND gate 18 is activated. The output signal from the AND gate 18, the run-up signal, gates into the frequency register 4 a run-up value from a register (or a hard-wired gate network) 14. This run-up value causes the phase number in the phase accumulator 6 to increase rapidly.

The run-up value can also be the nominal value, the latter being the value required to produce an output clocking signal (OUT) at the same rate as the input signal frequency. To reduce the run-up time, the run-up value can be larger but a third register (or hard-wired gate network) would be required to set the nominal value into the frequency register 4 at the end of the run-up mode. To simplify the explanation of the circuit operation, it will be presumed that the run-up value is also the nominal value. The phase number from the phase accumulator 6 and the phase number stored in the latch 11 are compared by a digital comparator 13. The output signal from the comparator 13, when the phase accumulator value equals the stored value, sets the flip-flop 15, which, because the flip-flop 16 was previously set, disables the run-up AND gate 18 and activates the AND gate 17 to produce the track signal. The output signal from the comparator 13 also resets the flip-flop 104 via an AND gate 107 while in the run-up mode, thereby disabling the clock signal from the AND gate 105. This causes the phase number in the phase accumulator to remain at the value stored in the latch 11 corresponding to the largest value of the correlation coefficient. (All the output bits from the phase accumulator 6—24 in the above example—are stored in the latch 11.)

The Z counter 101 continues to count and when its contents are equal to the stored value in the latch 102, the comparator 103 produces an output signal which sets the flip-flop 104, restoring the clock signals from the AND gate 105 to the phase accumulator. The Z counter 101 and the reset signal, line 106, restore the synchronization of the output signal (OUT) with the input signal.

Therefore, after the flip-flop 104 is set in the tracking mode, the arithmetic synthesizer, i.e., frequency register 4 and phase accumulator 6 track the input signal at the point of closest correlation. The AND gate 17 is periodically enabled by the output signal from the frequency divider 8 to produce a periodic track signal which is applied to the correlator 1. The output signals from the correlator 1 are pulses (U or D) that cause the frequency register 4 to increment or to decrement, maintaining the output signal (OUT) from the phase accumulator 6 in synchronization with the input signal.

Although described in terms of using a PRG as the signal pattern, it is considered that other signal patterns can be used, the circuit being adaptable by one of ordinary skill in the art given the teaching and principles of the invention as herein disclosed.

What is claimed is:

1. A circuit for synchronizing a clock signal with an iterative encoded input signal of period T comprising, in combination:

timing means for producing first timing signals;
   arithmetic synthesizer means, including phase accumulator means and frequency register means, responsive to said first timing signals for producing the clock signals, said frequency register means storing a frequency number;
   waveform generator means responsive to said clock signal for supplying an iterative encoded output signal having a waveform similar to said input signal but having a period different from the period of said input signal by $\Delta T$;
   correlator means for comparing said input signals with said output signals with the relation of the periods thereof being shifted by $\Delta T$ at each successive comparison to produce a succession of correlation signals and for producing modifying signals after correlation between said input signals and said output signals has been obtained;
   means responsive to said correlation signals for setting said phase accumulator means to a value corresponding to the largest correlation signal; and
   means coupling said modifying signals to the frequency register means for changing said frequency number to maintain the clock signals and the iterative encoded output signal in synchronism with said iterative encoded input signal.

2. The invention as claimed in claim 1 wherein said means for setting said phase accumulator means includes:

means for sweeping said input signal with said output signal from said waveform generator means;
   means responsive to said first timing signals for producing second timing signals;
   first and second storage means for storing correlation signals and phase accumulator signals, respectively, in response to a control signal;
   first comparator means responsive to said correlation signals for said correlator means and said stored correlation signals in said first storage means for producing an output signal when said correlation signal from said correlator means is greater than said stored correlation signals in said first storage means;
   means responsive to said second timing signals and said output signal from said comparator means for producing the control signal;
   means for producing an end-of-sweep signal; and
   means responsive to said end-of-sweep signal for setting the stored phase accumulator value from said second storage means into said phase accumulator means.

3. The invention as claimed in claim 2 wherein said means for setting the stored accumulator value corresponding to the largest correlation signal into said phase accumulator means includes:

means for disabling said control signal;
   means responsive to said end-of-sweep signal for setting a value in said frequency register means;
   second comparator means coupled to said phase accumulator means and said second storage means for producing an equality signal when the value in the phase accumulator means is equal to the stored phase accumulator value;
   means responsive to said equality signal for disabling said first timing signals to said phase accumulator means; and
   synchronizing means for enabling said first timing signals to the phase accumulator means.

4. The invention as claimed in claim 3 wherein said synchronizing means includes:

counter means responsive to said first timing means for storing a count value;
   third storage means coupled to said counter means for storing the count value in response to said control signal;
   gating means for coupling said first timing signals to said phase accumulator; and
   third comparator means coupled to said first timing signals and said third storage means for enabling said gating means when the count value in the counter means is equal to the count value in the third storage means.

5. The invention as claimed in claim 2 wherein said means for producing an end-of-sweep signal includes frequency divider means responsive to said second timing signals for producing said end-of-sweep signal.

6. A method for synchronizing a variable frequency clock signal with an iterative encoded input signal comprising the steps of:

generating locally an iterative encoded waveform similar in shape to the input signal in response to the clock signal;
   supplying a train of timing signals;
   synthesizing the clock signal with an arithmetic synthesizer to have an initial repetition rate which varies from the repetition rate of the iterative encoded input signal by $\alpha T$;
   sweeping the input signal with the locally generated waveform;
   deriving a correlation coefficient during the sweeping step;
   setting the arithmetic synthesizer to the phase value providing the greatest correlation signal; and
   synchronizing the timing signal to the arithmetic synthesizer with the input signal.

7. The invention as claimed in claim 6, wherein said sweeping step includes the step of setting a frequency number in the arithmetic synthesizer to cause the clock signal to occur at a rate different from that of the input signal.

8. The invention as claimed in claim 7, wherein the step of setting the arithmetic synthesizer includes the steps of:

counting said time pulses to produce a time count;
   comparing the derived correlation coefficient with a stored correlation coefficient;
   storing the derived correlation coefficient, the phase number from the arithmetic synthesizer, and the time count when the derived correlation coefficient is greater than the stored correlation coefficient;
   signalling the completion of the sweep of the input signal; and setting the stored phase number into the arithmetic synthesizer.

9. The invention as claimed in claim 8, wherein the step of synchronizing the timing signal includes the steps of:
   inhibiting said timing signals to the arithmetic synthesizer when the phase number has been set into the arithmetic synthesizer;
   comparing the timing count to the stored timing count; and
   permitting said timing signals to the arithmetic synthesizer when the timing count is equal to the stored timing count.

10. The invention as claimed in claim 8, wherein the step of setting the stored phase number includes the steps of:
   setting a run-up value as the frequency number in the arithmetic synthesizer;
   comparing the phase number in the arithmetic synthesizer to the stored phase number; and
   ending the run up when said phase number in the arithmetic synthesizer is equal to the stored phase number.

11. A method for synchronizing a clock signal with an iterative encoded input signal of a period T comprising the steps of:
   generating an iterative encoded waveform similar in shape to the input signal in response to and in synchronism with the clock signal;
   generating the clock signal with a repetition rate initially different by $\Delta T$ from the repetition rate of the iterative encoded input signal;
   iteratively sweeping the input signal with the generated iterative encoded waveform over the period T;
   determining the greatest correlating coefficient during the sweeping step;
   setting the phase of the clock signal to the phase providing said greatest correlation coefficient and;
   synchronizing the clock signal to the iterative rate of the input signal.

* * * * *